J. A. GRAY

July 11, 1933. Re. 18,890

METHOD OF AND APPARATUS FOR MAKING ANGULAR CONTAINERS

Original Filed Oct. 20, 1926 8 Sheets-Sheet 1

INVENTOR
James A. Gray
BY
Harry A. Totten
ATTORNEY

July 11, 1933. J. A. GRAY Re. 18,890

METHOD OF AND APPARATUS FOR MAKING ANGULAR CONTAINERS

Original Filed Oct. 20, 1926 8 Sheets-Sheet 2

INVENTOR
James A. Gray
BY Harry A. Tolles
ATTORNEY

J. A. GRAY
July 11, 1933.
Re. 18,890
METHOD OF AND APPARATUS FOR MAKING ANGULAR CONTAINERS
Original Filed Oct. 20, 1926 8 Sheets-Sheet 3
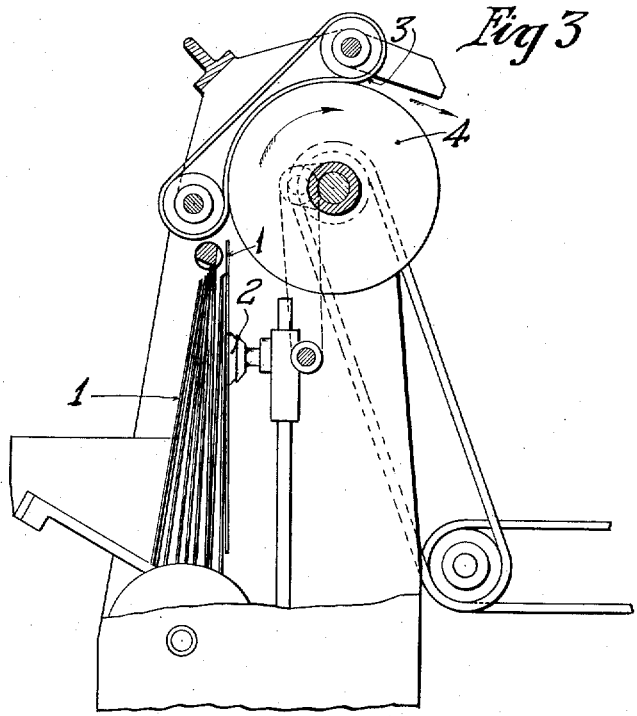
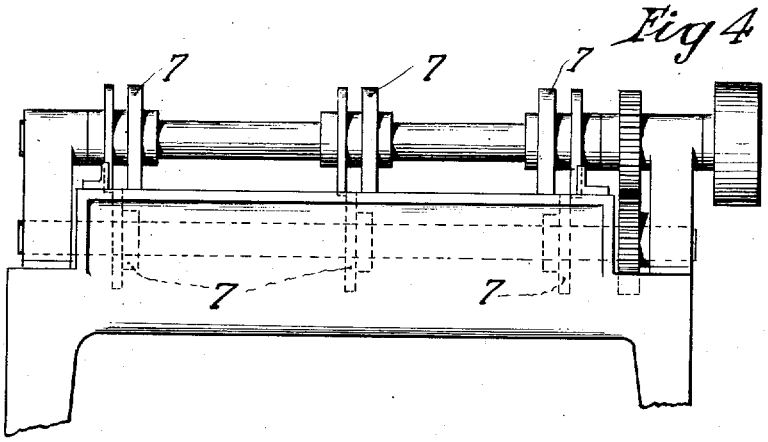
INVENTOR
James A. Gray
BY
Harry A. Tolles
ATTORNEY

J. A. GRAY

July 11, 1933.

Re. 18,890

METHOD OF AND APPARATUS FOR MAKING ANGULAR CONTAINERS

Original Filed Oct. 20, 1926 8 Sheets-Sheet 4

INVENTOR

BY James A. Gray

Harry A. Totten

ATTORNEY

J. A. GRAY

July 11, 1933. Re. 18,890

METHOD OF AND APPARATUS FOR MAKING ANGULAR CONTAINERS

Original Filed Oct. 20, 1926 8 Sheets-Sheet 5

INVENTOR
James A. Gray
BY Harry A. Tolles
ATTORNEY

J. A. GRAY

July 11, 1933.

Re. 18,890

METHOD OF AND APPARATUS FOR MAKING ANGULAR CONTAINERS

Original Filed Oct. 20, 1926 8 Sheets-Sheet 6

INVENTOR

BY James A. Gray

Harry A. Tollin

ATTORNEY

J. A. GRAY

July 11, 1933. Re. 18,890

METHOD OF AND APPARATUS FOR MAKING ANGULAR CONTAINERS

Original Filed Oct. 20, 1926 8 Sheets-Sheet 7

INVENTOR
James A. Gray
BY Harry A. Toulmin
ATTORNEY

J. A. GRAY
July 11, 1933. Re. 18,890
METHOD OF AND APPARATUS FOR MAKING ANGULAR CONTAINERS
Original Filed Oct. 20, 1926 8 Sheets-Sheet 8
Fig 16
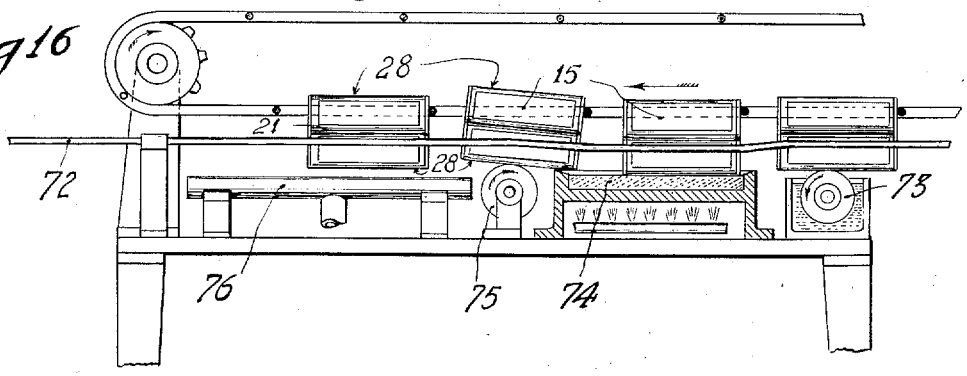
Fig 15
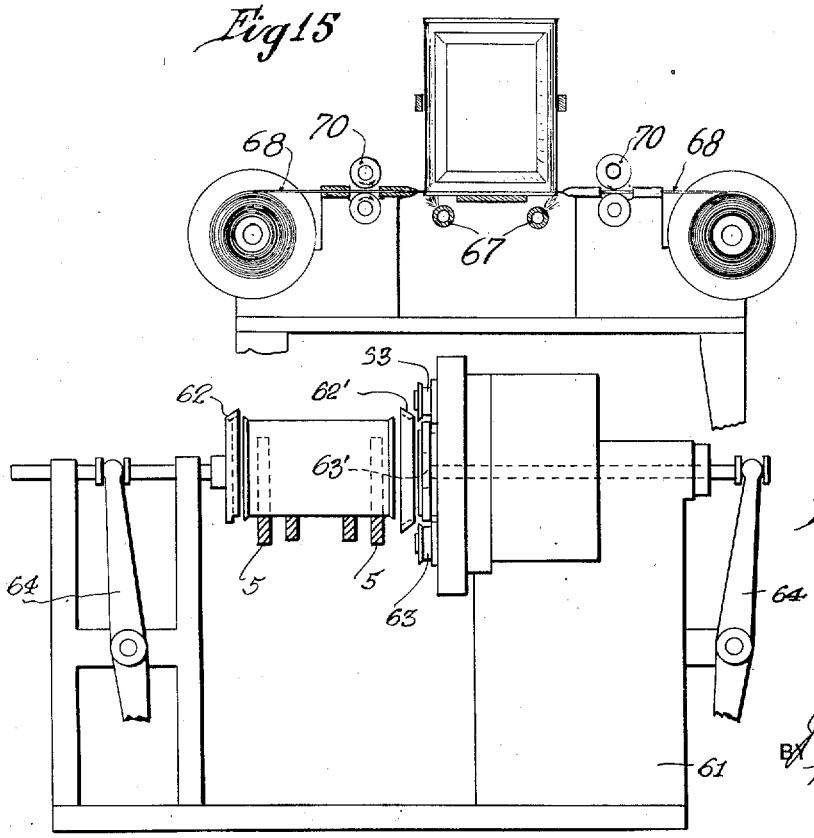
Fig. 14.
INVENTOR
James A. Gray
BY Harry A. Tolles
ATTORNEY Reissued July 11, 1933

Re. 18,890

UNITED STATES PATENT OFFICE

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY

METHOD OF AND APPARATUS FOR MAKING ANGULAR CONTAINERS

Original No. 1,792,978, dated February 17, 1931, Serial No. 142,832, filed October 20, 1926. Application for reissue filed February 17, 1933. Serial No. 657,249.

This invention relates to the automatic manufacture of containers, and more particularly to angular cans, preferably rectangular, of a relatively large size, consisting of a body constructed of a plurality of sections to which are united the ends, constituting a bottom and a top, the body and end seams being interlocked and soldered and the top preferably mounting a transporting means in the form of a handle.

The principal object of the invention is the method of manufacture of rectangular, closed, ended cans, which will permit of its practise, efficiently and economically, in a line of automatic machines.

Another object is the production of cans or containers of the above type, economically and efficiently in large quantities, rapidly on a full commercial scale, with the minimum of labor.

Another and important object is in the cutting of the body sheets for any given can or container from a single sheet of material, and, thereafter, uniting the same cut sheets, insuring the body of any given can being of material of the same weight and texture.

A further object is attained in cutting the body forming sheets for any given can or container from a single sheet or blank by reducing the trimming waste operations and labor now occasioned by the present practise, wherein two separate sheets of material are separately trimmed and prepared, and are thereafter united.

A further and important object is the automatic bringing together, by mechanical means, for subsequent assembly and uniting, of a plurality of angular blanks to form a can body.

Further objects will be apparent and will present themselves as the following description of one embodiment of the invention is understood in connection with the accompanying drawings illustrating the same.

To more fully comprehend the invention, reference is directed to the drawings, wherein I have shown the best means known to me for performing my method, but other suitable means may be employed. In said drawings—

Figure 3 is a side elevation, partly in section, of a machine for feeding body blank forming sheets to the receiving end of the apparatus.

Figure 4 is a view in front elevation of a slitter and trimming apparatus for receiving sheets from the sheet feeder—Fig. 3.

Fig. 14 is a view in transverse section of an end rolling or seaming machine for permanently seaming the ends to the can bodies, there being two of such machines employed.

Fig. 15 is a view in transverse section of one of the can end soldering stations for applying solder to the end seams of the can, there being four of such stations in the present organized apparatus.

Fig. 16 is a longitudinal view, partly in section, of one of the stations for soldering the side seams of the cans as the same are conveyed therethrough, there being two of such stations in the present organized apparatus.

Figure 1:
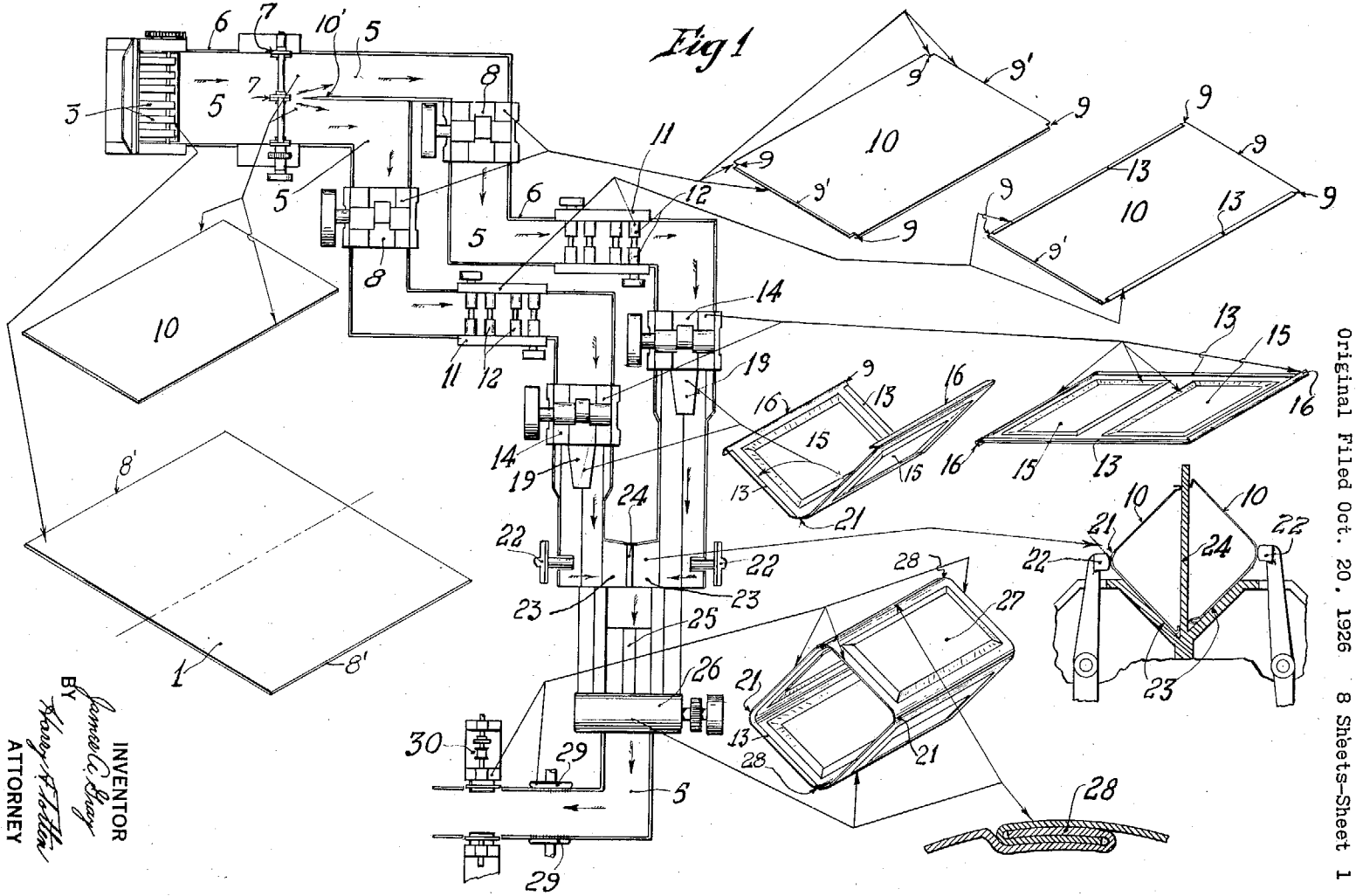
Figure 1 is a diagrammatic lay-out of the feed end portion of the apparatus at present preferred for the practise of my invention, the first stages of formation of one of the articles produced being illustrated at different stages of operation.
Figure 2:
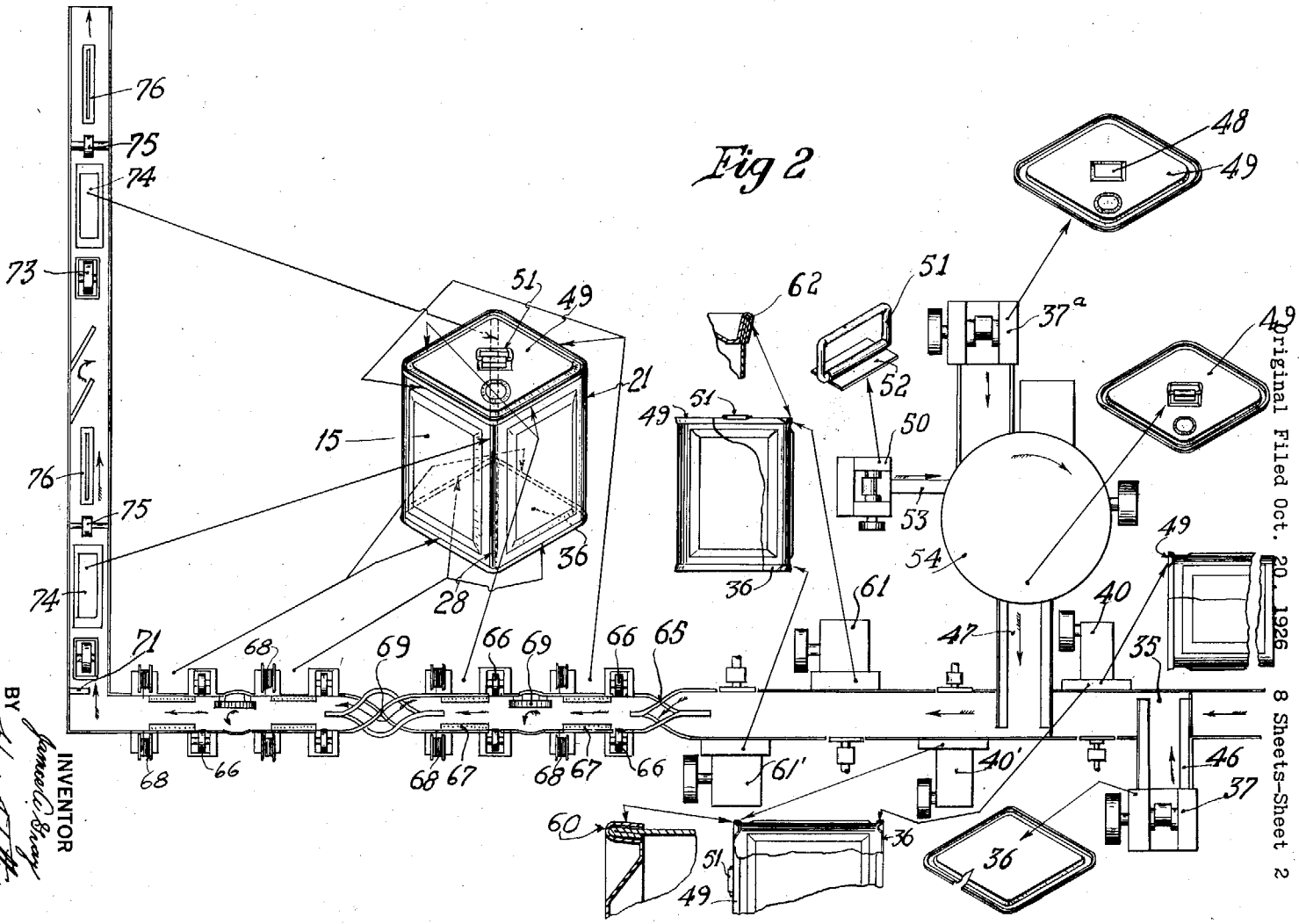
Figure 2 is a diagrammatic lay-out, similar to Fig. 1, of the remaining portion of the apparatus, the article being shown at different stages of the operation and completed.

Referring to the drawings, particularly Figs. 1, 2 and 3, sheets of tin plate 1 of a size which when longitudinally slit provide two body blanks, are successively fed, one at a time from a stack, by the suction head 2 upwardly between the conveying belt 3 and cylinder 4 to conveyer members, conventionally illustrated at 5 in Fig. 1; this sheet feeding means being designated in detail in my copending application for Letters Patent, Serial Number 717,853, filed June 4th, 1924.

The walls 6 of the conveyer guide the successively fed blanks beneath the slitting and trimming rolls 7 of a conventional slitting and trimming apparatus—Fig. 4.

The action of the slitting and trimming rolls is to trim the sheet 1 along edges 8′ (Fig. 1) and slit the same into duplicate body forming portions or blanks 10, which after leaving the slitter and trimmer, Fig. 4, are separated by blade 10′ (Fig. 1) and are conveyed by the conventional conveyer members 5 in different paths, they being guided by the respective conveyer edge walls 6. The respective trimmed body forming blanks 10 as conveyed by their respective conveyers 5 each pass through the blank notching mechanism, Fig. 5, consisting of a bed 7′ and reciprocating die 8, which operate to notch, as at 9, the four corners of the blanks and also trim the sheets 10 at 9′.

Figure 6:
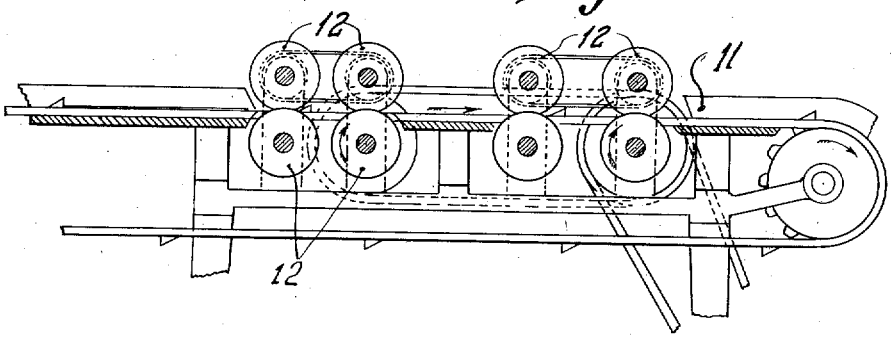
Fig. 6 is a longitudinal, sectional view of a conventional form of hemming machine for acting on the notched body forming blanks to flange or hem the opposite longitudinal side edges, two of said machines being employed in the present apparatus.
Figure 5:
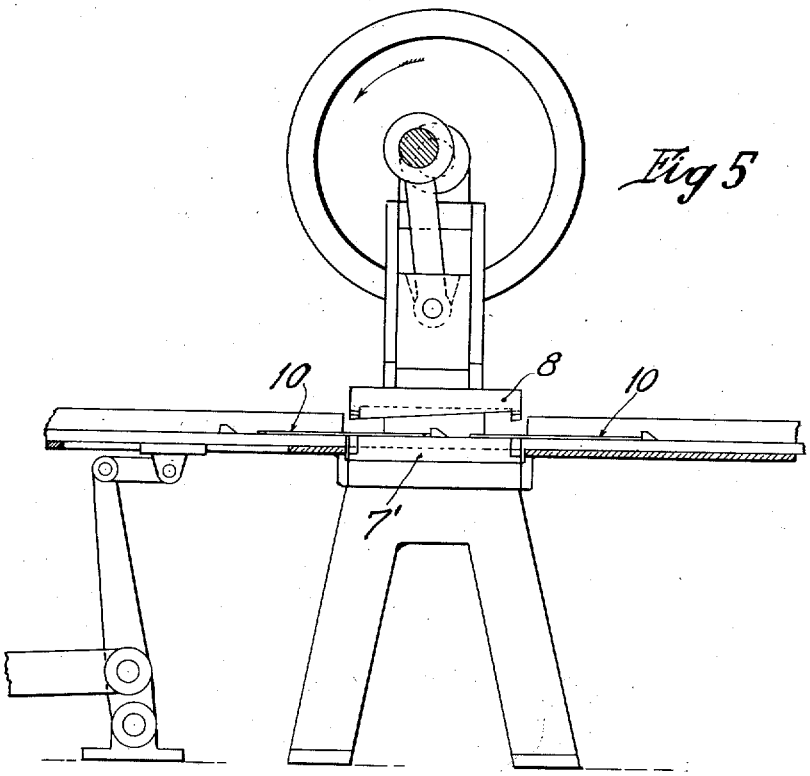
Figure 5 is a view in side elevation, partly in section of a notching and trimming apparatus, two of which are employed for operating on the slit sheets as delivered from the slitting apparatus—Fig. 4.

From the notching mechanism, Fig. 5, the blanks 10 with their notched corners 9 are again conveyed by the conveyers 5 and guided by the walls 6 in a direction at right angles to their previous direction of travel into and through a conventional form of hemming machine 11, Fig. 6, the same consisting of pairs of hemming rolls 12, which act on the longitudinal side edges of the notched blanks 10 to hem or flange the same, as at 13, the respective edges of the hems or flanges 13 being disposed inwardly against the face of the blank.

The conveyers 5 carry the hemmed and notched blanks 10, after leaving the hemming machines 11, at right angles to their previous direction and into and through a paneling and edging machine 14, of the conventional well known type, which machines act on the respective blanks to panel the same at 15, and, turn inwardly, as at 16, the edges thereof extending between the flanges or hems 13. The paneling and edging machine is conventionally illustrated in Fig. 7, and in its conventional illustration consists of a bed 17 and reciprocating die 18.

Figure 7:
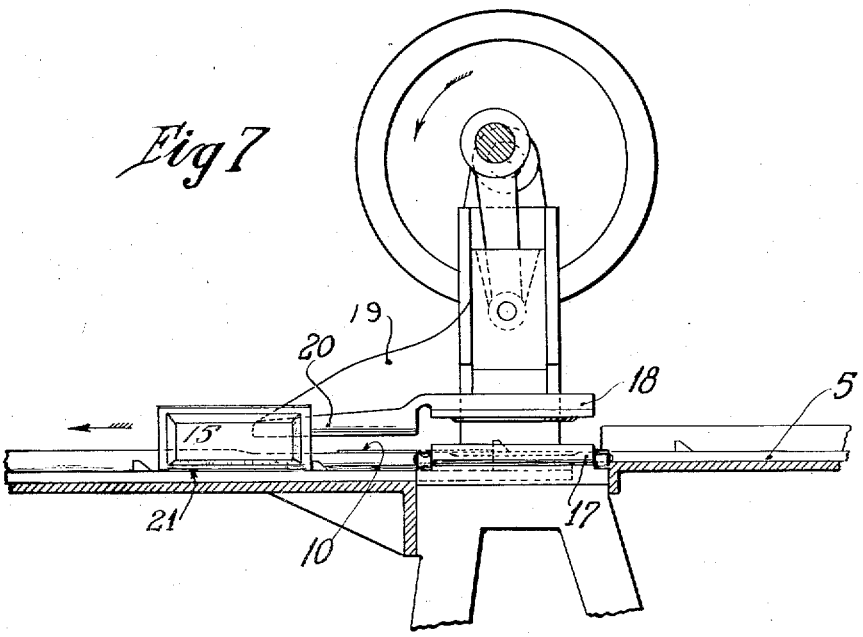
Fig. 7 is a view in longitudinal section of a paneling, bending and edging machine for receiving the blanks from the hemming machine—Fig. 6; two of said machines being employed in the present apparatus.

After being edged and paneled, the respective blanks are conveyed from the edging and paneling machine to the conventional blank body bender 19, also illustrated in Fig. 7 in the form of a reciprocating horn 20 extending forwardly from the reciprocating die 18 and movable therewith.

The action of the bending machine is to bend the respective blanks 10 to dispose the paneled portions thereof at substantially right angles to each other, connected by a relatively rounded corner 21—Fig. 1.

By the conveyers 5 the prepared body forming blanks 10 which were cut from a single sheet, are carried from the respective bending machines 19 to a point where the same lie opposite each other.

Figure 8:
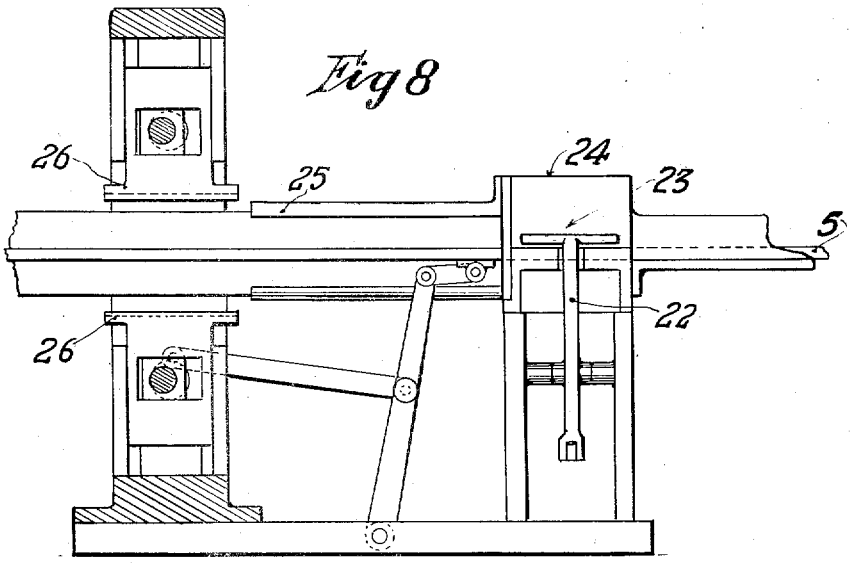
Fig. 8 is a view in side elevation, partly in section, of the mechanism for bringing the formed body blanks together, assembling and interlocking the edges thereof together to form a cam body.

With the body forming blanks 10 lying opposite each other, as above described, the timely operated arms 22 engage the same and push them toward each other, so that the same are received in the angularly disposed runways 23 arranged one on each side of a separating wall 24 of a body assembling apparatus, illustrated in Fig. 8.

When respective body blanks are received in the runways 23, the hemmed or hooked edges thereof lie opposite each other, as in Fig. 1, and when in this position, the body forming sections are propelled forwardly in unison by the conveyer mechanism 5 along the interlocking and can body bumping machine which, as previously stated, is conventionally illustrated in Fig. 8.

The mechanism constituting the disclosure in Fig. 8 is more fully described and set forth in detail in my copending application—Serial Number 749,497. This apparatus as illustrated in Fig. 8, consists of the interlocking horn 25 and the interlocked flange bumping members 26.

The action of the interlocking and seam bumping mechanism is to automatically unite the hemmed or hooked edges of the paneled and bent body forming sections 10, to provide an open ended can body, indicated by the numeral 27—Fig. 1, the seams of said body being located at diametric opposite corners with the portions 16 of the respective blanks interlocking and flattened, as at 28.

The open ended can body which has thus been formed of two body forming blank sections cut from the same sheet of material, is conveyed from the seam bumping press by the conveyer 5 and is moved at right angles to the direction of its passage through the member 26, so that the free edges of the opposite ends of the body will move through flames from opposing jets 29, located opposite each other at opposite sides of the conveyer 5.

The action of the flame of the jets is to burn off or melt from the ends of the can body any grease or volatile material that may be adhering thereto, and to prepare the ends to receive a coating of flux.

Figure 9:
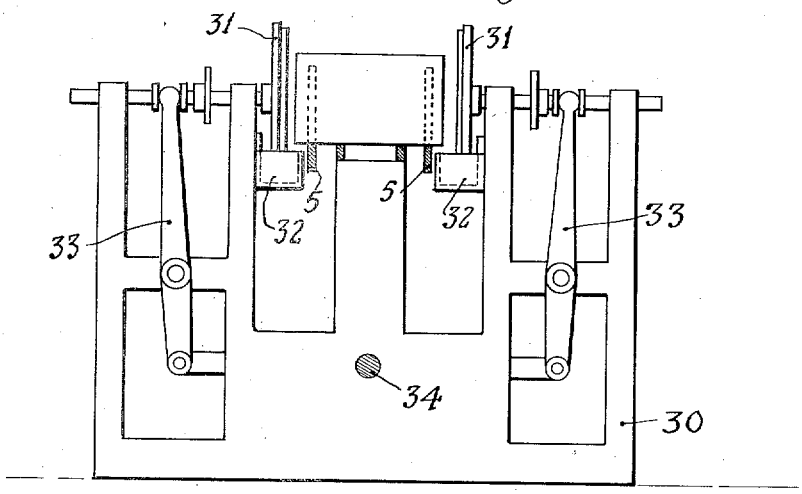
Fig. 9 is a view in transverse section of an apparatus for applying flux to the ends of the formed can bodies, after the same are conveyed thereto from the apparatus—Fig. 8.

After passing the burners 29, the body is conveyed to an apparatus, conventionally illustrated in Fig. 1 by the numeral 30, for applying flux to the opposite ends of the body. This flux applying mechanism is conventionally illustrated in Fig. 9, and consists of the opposing axially rotatable body and engaging members 31 which carry suitable liquid flux absorbing pads extending in the flux receptacles 32, the members 31 being moved to and from each other by a suitable lever mechanism 33, operated from a shaft 34, there being the usual conveyer mechanism 5 for conveying the bodies to and from the members 31.

Figure 11:
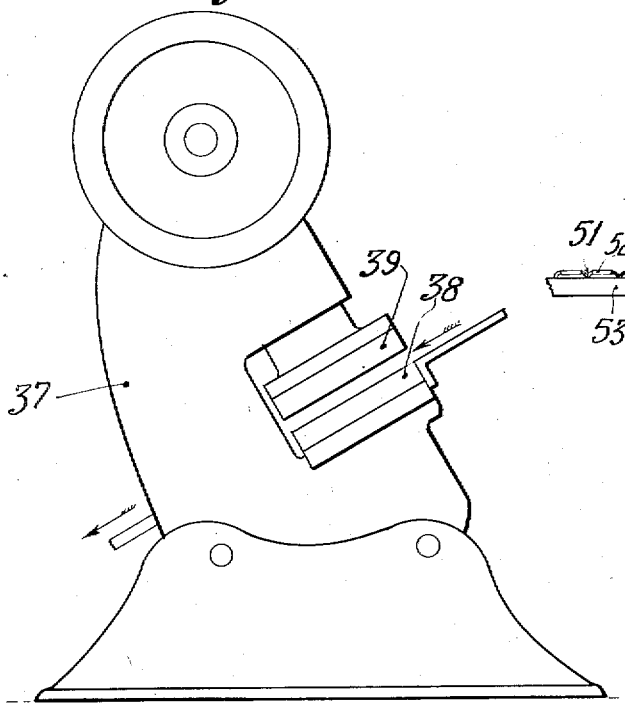
Fig. 11 is a view in side elevation of a conventional form of end press for forming rectangular ends of conventional rectangular cans, two of such apparatuses being employed in the present organized lay-out.

After the opposite ends of the body have received a coat of flux, the body is conveyed to a point 35, Fig. 2, where a bottom is aligned with one end of the prepared can body. This bottom as indicated by the numeral 36, Fig. 2, is of the conventional form, and is stamped from plate by a conventional end forming press 37, illustrated in Fig. 11, and consisting of the bed 38 and movable die 39.

Conveyers, not illustrated in detail, are employed for conveying the stamped ends to the point 35 to align with one end and form the bottom of the bodies, as the same successively arrive at the point 35. From this point the conventional conveyer mechanism 5 conveys the body with its aligned bottom end to a conventional form of end squeezer mechanism, illustrated in Fig. 2 by the numeral 40, illustrated more in detail in Fig. 10 of the drawings.

Figure 10:
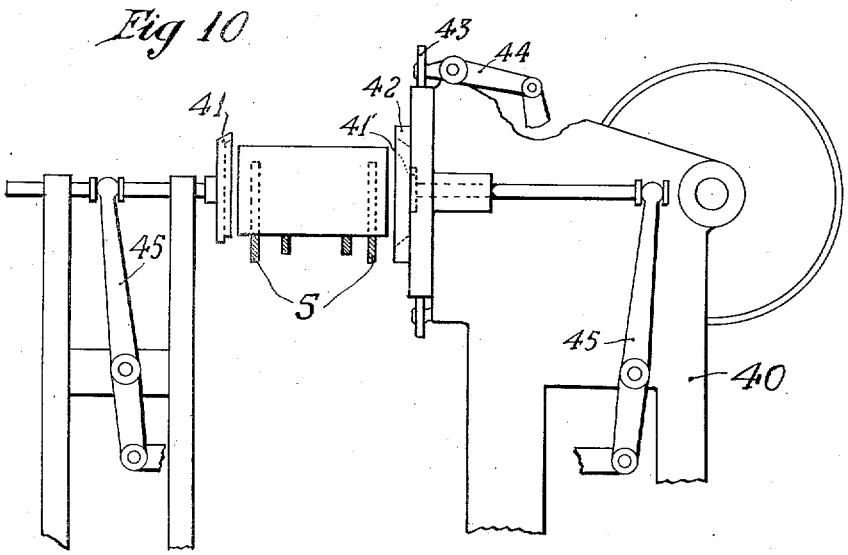
Fig. 10 is a view in transverse section of an apparatus for squeezing or loosely uniting an end member to one end of the can body, there being two such machines employed in the present organized apparatus.

The squeezing mechanism, illustrated in Fig. 10, and by the numeral 40 in Fig. 2, consists briefly of the holding chuck 41 and the squeezing chuck 42, which latter mounts the reciprocating flange squeezing members 43. The latter members are operated by interconnected mechanism 44, and chuck 41 and knockout 41′ are reciprocated to and from each other by suitable lever mechanism 45.

Figure 12:
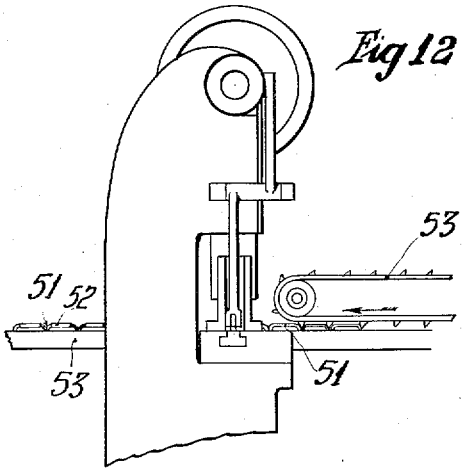
Fig. 12 is a view in side elevation of a handle cleat forming and assembling press for assembling and delivering cleated handles to the formed can ends after the same are delivered from one of said end forming presses.

From the side of the conveyer mechanism 5, opposite to that which the runway 46 leading from the end press 37 enters, is another end feed cnnveyer 47—Fig. 2. The end forming press 37ᵃ, preferably provided in its die forming portion with an insert to provide a depression 48 in an end stamped thereby, constitutes a can top or end forming press which provides tops or ends for the successive bodies. As the ends 49 are conveyed from the press 37ᵃ a mechanism illustrated conventionally by the numeral 50 (Fig. 2), and constituting a handle and cleat assembling press (Fig. 12) assembles a handle 51 and cleat 52, and conveys the same by the conveyer 53—Fig. 12, to the depression 48 in a can top or end, moving in timed relation with the conveyer 53. This mechanism is conventionally illustrated in Fig. 12, and is more fully described and set forth in my co-pending application—Serial No. 27,590, filed May 2nd, 1925.

Figure 13:
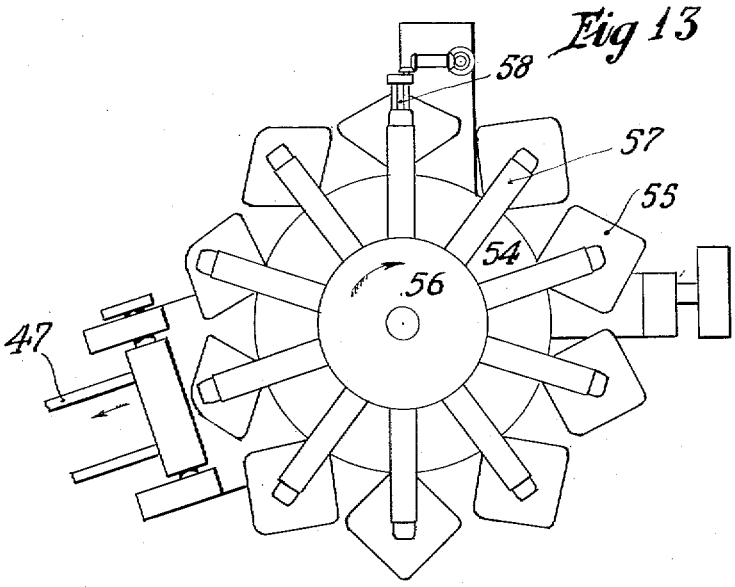
Fig. 13 is a view in top plan of a handle soldering machine for uniting the cleats to the end members, as the same are successively assembled, said machine thereafter delivering the assembled end for uniting to one end of the formed can body as the same registers therewith.

The can top and handle assembling and soldering mechanism are illustrated in Fig. 13 and are conventionally illustrated as containing the turret 54 carrying the container end supporting forms 55 and the turret 56 carrying the radially disposed cleat and handle supporting arms 57, one of which overlies each form 55, soldering mechanism 58 being quite briefly illustrated for supplying solder to cause the uniting of the parts. This apparatus is described in detail in my co-pending application, Serial No. 67,486, filed November 7th, 1925, entitled—Handle soldering apparatus.

From the mechanism, Fig. 13, the can ends or tops 49, in Fig. 2, are successfully conveyed along the conveyer 47 to align with the end of the successive can bodies when the same are in register with the end of the conveyer 47. With its aligned top or end 49, Fig. 2, the can body is conveyed to the second end squeezing apparatus 40′, Fig. 2, for squeezing the top end to the can body. This mechanism 40′ is a duplicate of that illustrated in Fig. 10, but is positioned at the opposite side of the conveyer from that illustrated by the numeral 40—Fig. 2.

From the end squeezing mechanism illustrated by the numeral 40′, Fig. 2, the bodies with their end members loosely secured thereto by the joint seams 60, Fig. 2, are conveyed successively to the end rolling mechanisms 61 and 61′, which act on or roll the squeezed end seams 60, permanently uniting the can ends to the body to make a tight joint thereof, as at 60—Fig. 2. The mechanisms 61 and 61′ are conventionally illustrated in the disclosure in Fig. 14, and constitute a conventional form of end seam rolling apparatus, which comprises the can end engaging chucks 62 and 62′ and the seaming rollers 63;

co-acting instrumentalities being provided for operating the rollers 63 to roll or seam the respective can ends. Link and lever mechanism 64 is illustrated for moving the chuck 62 and knockout 63′ lineally to and from each other.

When operated on by the mechanism 61′, the cans are disposed transversely of the conveyer 5 and after leaving said mechanism 61′, Fig. 2, the cans are placed on end by any suitable mechanism, such as the conventionally illustrated spiral track 65. After being positioned on end, the rolled seams uniting the ends to the can body are soldered to insure a leak-proof joint, and this is accomplished by conveying the can first between flux supplying rolls 66, then over seam heating jets 67 and then into contact with automatically fed solder wire 68, and, thereafter, turning the upright can 90 degrees by conveying the same over a conventional turning mechanism 69 and subjecting the uncoated or soldered seams successively to a second set of flux applying rolls 66, seam heating jets 67 and solder wire 68. This mechanism is conventionally illustrated in Fig. 15, which figure illustrates the rolls of soldering wire 68, the ends of which are automatically maintained in contact with the fluxed heated seams of the can by the rollers 70, and is set forth in detail in United States Patent No. 1,391,869, granted to John C. Strickler, Sept. 27, 1921.

After the above operation, the can is inverted by means of the spiral track 69 or other conventional inverting mechanism illustrated in Fig. 2, and the other end of the can is subjected to the same soldering operations, the rolled seams being first subjected to a flux, then heat and solder applied thereto, the steps of the operation being illustrated by the arrows extending to the illustrations of the completed can—Fig. 2 of the drawings.

After the end seams have been soldered, the can on end is conveyed by the conveyer 5 over a trip mechanism 71, which trips the can to a substantially horizontal position onto the guide rails 72, conventionally illustrated in Fig. 16 of the drawings, and, thereafter, the body side seams, are, during the conveying of the cans, subjected to a soldering operation to permanently seal said side seams.

Each of the side seam soldering mechanisms consists of an acid roller 73, a solder bath 74, through which each side seam of the can is conveyed after having applied flux or acid thereto, a solder wiping roll 75 for removing the excess of solder and wiping the joint clean, and an air cooling jet applying duct 76 for insuring a rapid cooling of the soldered body seam.

After passing the first group of these units, Fig. 16 of the drawings, the can is axially rotated to present its other side seam downwardly disposed, and said latter seam is, in turn, subjected successively to the second group of units identical with the former group as illustrated in Fig. 16, for soldering the remaining side seam of the can body.

The conveying means illustrated and set forth by the numeral 5 in Fig. 1, may be of any suitable structure, either of an endless continuous type as illustrated in Fig. 6, or of a reciprocating type as in Fig. 5, so long as the same is operated to convey the articles at the desired speed and in co-ordination with the operation of the parts to which the articles are presented or from which the same are removed.

It is also to be understood that the various parts and elements of the herein described organized apparatus operate in timed relation, so that the articles as they progress through the apparatus will be successively arrested when necessary and acted on in their advancement toward completion.

The method claims herein are the same as method claims in application Serial No. 517,162, filed February 20, 1931.

I claim:

1. An organized apparatus for making angular containers, comprising means for preparing separate substantially duplicate body forming sections of angular shape, means for assembling and permanently uniting said sections into angular body forming relation, means for preparing body end closing members, means for uniting said ends to the respective ends of the formed body, and means for soldering the container joint seams, all of said means comprising machines arranged in a connected line and adapted to produce finished containers by successive operations upon the sections as the latter are automatically fed along the line, and conveying means acting in co-ordination with and intermediate said preparing means, uniting means and soldering means.

2. An organized apparatus for making angular containers, comprising, container part forming, container part conveying, and container part assembling elements co-ordinated for continuous operation, the first named element comprising mechanisms for preparing a plurality of angular body sections, and mechanisms for preparing a plurality of end sections, the conveying element comprising mechanism for presenting the body and end section parts in proper timed relation to the various forming mechanisms and to various mechanisms constituting the assembling element, some of said assembling mechanisms uniting the body sections into an angular unit container body, and other of said assembling mechanisms uniting the end section parts, the end sections, and the unit container body to form a complete angular container.

3. An organized apparatus for making angular containers, comprising, means for slitting a single sheet part into two separate blanks, means for preparing substantially duplicate body forming sections from said blanks, means for assembling and uniting said body forming sections into an angular container body, means for preparing a pair of container ends, means for assembling and uniting said container ends to the angular container body, and conveying means acting in coordination with and intermediate said container body and said container end preparing, assembling, and united means.

4. An organized apparatus for making angular containers, comprising, means for slitting a single sheet part into two separate blanks, means for preparing substantially duplicate body forming sections from said blanks, means for assembling and uniting said body forming sections into an angular container body, means for soldering the container joint seams, and conveying means acting in coordination with and intermediate said container body preparing, assembling, and uniting means.

5. An organized apparatus for making angular containers, comprising, means for trimming, notching, hemming, paneling, edging and bending body forming sections into angular form, means for assembling and permanently uniting a plurality of said sections into body forming relation to form an angular container body, means for preparing body end closing members, means for uniting said ends to the respective ends of the formed body, all of said means comprising machines arranged in a connected line and adapted to produce finished containers by successive operations upon the sections as the latter are automatically fed along the line, and conveying means acting in co-ordination with and intermediate said preparing means and said uniting means.

6. An organized apparatus for making angular containers, comprising, means for trimming, notching, hemming, paneling, edging and bending body forming sections into angular form, means for assembling and permanently uniting a plurality of said sections into body forming relation to form an angular container body, means for preparing body end closing members, means for uniting said ends to the respective ends of the formed body, means for soldering the container joint seams, all of said means comprising machines arranged in a connected line and adapted to produce finished containers by successive operations upon the sections as the latter are automatically fed along the line, and conveying means acting in co-ordination with and intermediate said preparing means, uniting means, and soldering means.

7. An organized apparatus for making angular containers, comprising, means for trimming, notching, hemming, paneling, edging and bending body forming sections, means for assembling and permanently uniting said sections into body forming relation to form a container body, means for forming a body end closing member, means for uniting said member to one end of said container body, means for forming a second body end closing member, means for permanently uniting a handle member to said second end member, means for uniting said second member with its handle member attached to the opposite end of said container body, and conveying means acting in co-ordination with and intermediate said preparing means and said uniting means.

8. An organized apparatus for making angular containers, comprising, means for trimming, notching, hemming,, paneling, edging and bending body forming sections, means for assembling and permanently uniting said sections into body forming relation to form a container body, means for forming a body end closing member, means for uniting said member to one end of said container body, means for forming a second body end closing member, means for permanently uniting a handle member to said second end member, means for uniting said second member with its handle member attached to the opposite end of said container body, means for soldering the container joint seams, and conveying means acting in co-ordination with and intermediate said preparing means, uniting means, and soldering means.

9. An organized apparatus for making angular containers, comprising, means for slitting a single sheet part into two separate blanks, means for preparing substantially duplicate body forming sections from said blanks, means for assembling and uniting said body forming sections into an angular container body, and conveying means acting in co-ordination with and intermediate said container body preparing, assembling and uniting means.

10. An organized apparatus for making angular containers, comprising means for uniting certain of the edges of two prepared body forming sections to form a container body, means for uniting the edges of prepared container ends with certain edges of the container body to form an angular container, and conveying means acting in co-ordination with and intermediate said container body and said container end uniting means.

11. An organized apparatus for making containers, comprising, means for preparing angular body forming sections, means for preparing one body end closing member, separate means for preparing a second body end closing member, means for assembling and uniting said body forming sections with each other and with said body end closing members to form a finished angular container, and conveying means acting in co-ordination with and intermediate said container body and said container end preparing and uniting means.

12. An organized apparatus for making containers, comprising, means for preparing an angular body end closing member, means for preparing a second angular body end closing member, conveying means for successively presenting a formed angular container body to the first prepared body end closing member and to the second prepared body end closing member, and assembling and uniting means securing the container parts together to form a finished container, all of said means comprising mechanism arranged in a connected line adapted to produce finished containers by successive operations upon the container parts as the latter are automatically fed along the line.

13. The method of making angular can bodies which consists in slitting a sheet into two parts, forming two angular half-bodies for cans from said sheet parts, interlocking together said half-bodies to form can bodies, forming the can ends, securing the can ends to said can bodies, performing said steps of the method in timed relation, and conveying the said can parts in co-ordination with and intermediate said steps of the method.

14. The method of making angular can bodies which consists in slitting a sheet into two parts, forming two angular half-bodies for cans from said sheet parts, interlocking together said half-bodies to form can bodies, forming the can ends, applying the can ends to said can bodies, rolling the end seams of said can bodies, performing said steps of the method in timed relation, and conveying the said can parts in co-ordination with and intermediate said steps of the method.

15. The method of making angular can bodies which consists in slitting sheets to form separated sections, notching and hemming said separated sections, separately forming two angular half-bodies for cans from the sheet sections, interlocking together the hemmed edges of said half-bodies to form can bodies, forming the can ends, securing the can ends to said can bodies, performing said steps of the method in timed relation, and conveying the said can parts in timed relation intermediate said steps of the method.

16. The method of making two-part angular can bodies which consists in simultaneously conveying two body-section blanks, successively notching, hemming and bending into angular form said two blanks, each of said blanks being treated separately as above described, then forcing towards each other said treated and bent blanks until their hemmed edges lie opposite to each other, then conveying the opposed blanks forward in unison, and interlocking the opposed hemmed edges of said body sections, the can parts being conveyed during the performance of the above steps of the method in co-ordination with and intermediate said steps.

17. The method of making two-part angular can bodies, which consists in simultaneously conveying two body-section blanks, successively notching, hemming, and bending into angular form said two blanks, each of said blanks being treated separately as above described, then forcing towards each other said treated and bent blanks until their hemmed edges lie opposite to each other, then conveying the opposed blanks forward in unison, and interlocking the opposed hemmed edges of said body sections, then bumping said interlocked edges to form an open-ended can body, then conveying said can body and causing its end edges to pass through heating means, and then through flux applying means, then conveying into engagement a can end and one end edge of said body, then conveying said body and can end to squeezing means and compressing said bottom and can body edge into tight flanged engagement, then conveying into engagement a can end and the other end edge of said body, then conveying said parts to squeezing means and compressing said top and can body edge into tight flanged engagement, the can parts being conveyed during the performance of the above steps of the method in co-ordination with and intermediate said steps.

18. The method of making angular containers by a continuously operating, co-ordinated mechanism, which consists in slitting a single sheet part into two separate blanks and conveying each blank individually through a series of separate but substantially identical operations to a point of assembly, thereby obtaining a pair of angular half-bodies from the same sheet part, and reuniting said parts by interlocking together said half-bodies to form a single container body.

19. The method of making angular containers by a continuously operating, co-ordinated mechanism, which consists in slitting a single sheet part into two separate blanks and conveying each blank individually through a series of separate but substantially identical operations to a point of assembly, thereby obtaining a pair of angular half-bodies, reuniting said parts by interlocking together said half-bodies to form a single container body, preparing a pair of container ends and conveying each prepared end into contact with the prepared container body, and securing said ends on to said container body to form a complete angular container.

JAMES A. GRAY.